READILY REMOVABLE MARKING COMPOSITION FOR RECORD MATERIAL

Original Filed Nov. 9, 1955

INVENTORS
MARSHALL MAZER
HARRY N. VOSMER
BY Louis A. Kline
Albert L. Seidler Jr.
THEIR ATTORNEYS United States Patent Office 2,950,256 Patented Aug. 23, 1960

2,950,256

READILY REMOVABLE MARKING COMPOSITION FOR RECORD MATERIAL

Marshall Mazer and Harry N. Vosmer, Dayton, Ohio, assignors to The National Cash Register Company, Dayton, Ohio, a corporation of Maryland Original application Nov. 9, 1955, Ser. No. 545,959. Divided and this application Mar. 4, 1957, Ser. No. 643,639

1 Claim. (Cl. 252—301.2)

This invention relates to a novel method and substance for making readily-removable control marks on record material and for utilizing the marked material.

This is a division of the application for United States Letters Patent, Serial No. 545,959, filed November 9, 1955, by the present applicants.

In the invention, marking material is applied on a record member to represent desired data, according to a predetermined code. The record member may be a bank check, a promissory note, a bill of exchange, a statistical card, a ticket, or other document. The marking material comprises a light-activatable sublimable substance carried in a liquid which is readily evaporable to leave the sublimable substance uncovered, so that it may sublime. After being marked, the record member may be sensed by any appropriate means for apparatus control, or visually observed by an operator. Once the marks have been sensed and are no longer needed on the record member, they may be removed by application of heat to the record member, causing the markings to sublime off, thus restoring the record member to its original, unmarked, condition. The record member may then, if desirable, be marked again by the same or other means, without showing the original data.

The use of light-activatable markings on record members for apparatus control is known, as shown, for example, in United States Patent No. 2,704,634, issued March 22, 1955, to Konrad Rauch. However, the markings disclosed in the above-mentioned patent were of a permanent type, lacking the quality of removability, which is an important feature of the present invention, and therefore could not be removed from a record member to which they had been applied without causing permanent, visible damage thereto.

One advantage of this invention lies in the simplicity of the process for removing the marking material from the record member and in the effectiveness of such removal, which leaves no trace of the light-activatable marking and does not damage the record member. This eliminates the possibility of sensing the wrong one of two or more conflicting or inconsistent sets of data representations on the record member and renders the use of different marking areas on the record member unnecessary, since the same area may be used for successive series of marks, each of which may be completely removed after use to make the entire marking area available for the next application of data.

One possible application of this invention which utilizes the important advantage of easy and complete removability of the marking material is in a system for coding bank checks for routing them through banks. After the check has been processed by a bank, the code representation is no longer needed and may be removed, so that the marking area will not be obscured and will be available for further use.

The operation of such a system might be as follows. At the bank where a check was cashed, it would be inspected to ascertain to which clearing house it should be sent, and accordingly coded by a coding machine provided with suitable type members and a printing ribbon impregnated with the liquid marking material of the present invention. The check would then be placed in a sorting machine which would classify all such checks for shipment to various banks or clearing houses according to their control markings. The markings on the check would be activated by radiation of the proper wave length and sensed to control the machine for check sorting. The control markings could also be arranged to give other information in addition, such as the amount of the check and the account number of the drawer or the payee. After completion of the sensing operation, the check would pass to a heating station, where application of heat would cause the markings to sublime and pass off in a gaseous state, leaving the check in an unmarked condition. When the check has reached its next destination, it could be again marked and sorted for further processing.

It will be seen that conventional coding systems which employ perforations or other permanent markings could not be successfully used in the above application for repeated data markings, due to the limited space available for such markings on a check and the likelihood of confusion and error in having one set of permanent markings superimposed upon another. However, a coding system employing marking material of the present invention is ideally suited for such use, due to the feature of easy removability of the control marks after each sensing operation.

It is to be understood that the invention is not limited to the above use but may be used in other applications in which the feature of easy removability is desirable.

An object of this invention is to provide a novel record member having thereon control markings of a type which may be removed to restore the member to its original, unmarked, condition.

An additional object is to provide a novel method for temporary recording on a record member by the application of a removable marking material to the record member and subsequent removal of the marking material by the application of heat to the record member.

A further object is to provide a novel marking material which may be removed from any surface to which it is applied by the application of heat and without damage thereto.

Another object is to provide a novel method for controlling a record-controlled apparatus by applying inactive, but activatable, control markings to a record member, activating the markings, sensing the activated markings for control of the apparatus, and restoring the record member to its original, unmarked, state.

Other objects of the invention will become apparent from the following description and claim and the accompanying drawings, which disclose, by way of example, a preferred embodiment of the invention.

Figure 1:
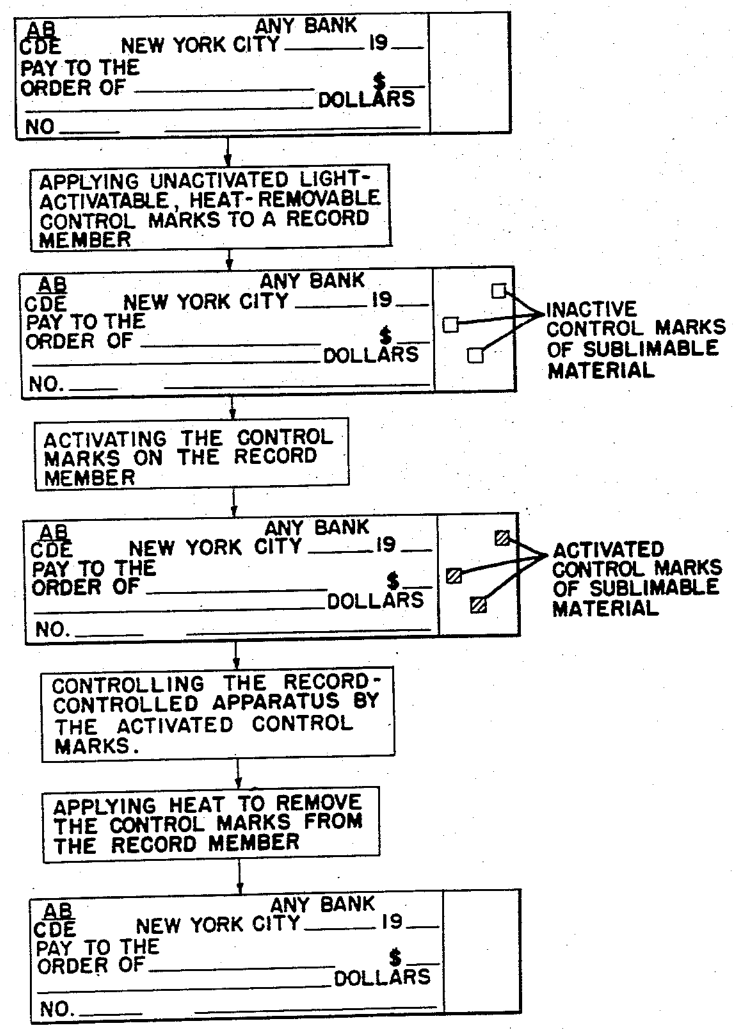
Fig. 1 is a flow chart showing the steps constituting a novel method for controlling a record-controlled apparatus by a record member bearing temporary markings.

The quality of removability which characterizes the marking material of the present invention is derived from the fact that said material consists of a sublimable light-activatable solid carried in an evaporable liquid vehicle. Marking material of such composition may be applied to the member to be marked by any conventional method, such as by pen, by stamps, or by impregnating a printing ribbon with the material and using the ribbon in conjunction with a type member to make an impression on the record member to be marked.

In its preferred form, the marking material is invisible under ordinary light but fluoresces when activated by radiation of the proper wave length. The data may, therefore, be made readable only by an authorized person, provided with the proper equipment. This feature is obviously of great value when the data represented is confidential in nature.

Marking material having these qualities of ready removability and of invisibility under ordinary light may be made by preparing a first solution of anthracene and ethyl hexane-diol in the proportion of four grams of anthracene to 100 cc. of ethyl hexane-diol. In mixing this solution, the ethyl hexane-diol should be heated to a temperature of 200 to 220 degrees Fahrenheit, in order for the anthracene to go readily into solution. A second solution, comprising naphthacene and xylene in the proportion of $\frac{1}{10}$ gram of naphthacene to 100 cc. of xylene, is also prepared, the xylene being preferably heated to about 150 degrees Fahrenheit to aid solution. The two solutions are then mixed at a temperature of about 180 degrees Fahrenheit in the ratio of 100 cc. of the first solution to 40 cc. of the second solution, to produce the marking material of the present invention. It is desirable to reduce the temperature of the first solution to the stated 180 degrees Fahrenheit before mixing the two solutions, in order to prevent possible evaporation of the xylene, which boils at a temperature of about 230 degrees Fahrenheit.

Once the two solutions have been mixed, the temperature may be raised to above 180 degrees Fahrenheit, since it is no longer important that the xylene remain in the solution, it merely having served as a convenient means of getting the naphthacene into solution. If the marking solution is to be applied to a printing ribbon, it is desirable that this be done at a temperature of 200 to 220 degrees Fahrenheit, since at lower temperatures the anthracene and the naphthacene begin to crystallize out. However, once the ribbon has been impregnated, it may be cooled to room temperature and will thus be left damp with the solid material therein partially crystallized out.

The liquid carrier of the marking material will eventually evaporate after application to the surface of the record material to be marked, leaving the anthracene and the naphthacene deposited in crystalline form on said surface. These materials, which are practically colorless as applied, and therefore invisible under ordinary light, will fluoresce under application of ultra-violet radiation of the proper wave length and may then be sensed for whatever purpose is desired. The anthracene and the naphthacene, possessing the physical characteristic of being sublimable under ordinary atmospheric conditions, will, therefore, pass directly from their solid crystalline state to a gaseous state upon the application of heat. Hence the application of heat to a record member, for example, upon which control markings have been printed, using the marking material of the present invention will cause said marking material to change directly from a solid to a gas, and to pass off into the surrounding atmosphere, leaving no discernible trace of the marking on the record material. It has been found that holding the marked record member in a heating station at 300 degrees Fahrenheit for a period not exceeding two seconds is sufficient to remove all discernible traces of the markings and will not harm a record member made of conventional record material, such as paper or cardboard. Also it should be noted that the ingredients used in the marking material are inert with respect to record members made of conventional material and therefore will not react with a record member to leave permanent markings thereon.

The solution of anthracene in ethyl hexane-diol may also be used alone as a satisfactory marking material. Naphthacene is added thereto in the preferred form in order to produce a shift in wave length of the emitted fluorescent light from blue to green. This enables the use of a sensing photo-cell of a type which is sensitive to visible light and is not sensitive to ultra-violet rays and which therefore does not react to any radiation which might be reflected by the unmarked portion of the record member from the ultra-violet light source used as an activating means. However, it will be understood that the use of anthracene alone as a blue fluorescing material, in combination with a photo-cell which is sensitive to ultra-violet radiation, would be satisfactory on a poor ultra-violet reflecting surface, since the amount of ultra-violet activating radiation reflected by an unmarked portion of such record member would be small in comparison with the amount of radiation received by the photo-cell from the activated marking.

It is not desired to limit the composition of the marking material to the particular ingredients set forth above. Other substances which have been found to possess the desired qualities of fluoroescence and sublimability, and which are otherwise suited for use as the primary ingredients in the marking material, are benzoic acid, anthranilic acid, beta-naphthol, fluorene, phenanthrene, and acenaphthene. Similarly, other liquid carriers may be used in place of the ethyl hexane-diol and xylene, mentioned above. Carriers which have been tested and found satisfactory include phenylethylene glycol, dipropylene glycol, and glycol diacetate. Any of the above primary ingredients may be dissolved in any of the above carriers to produce a marking material having the desired qualities.

Figure 2:
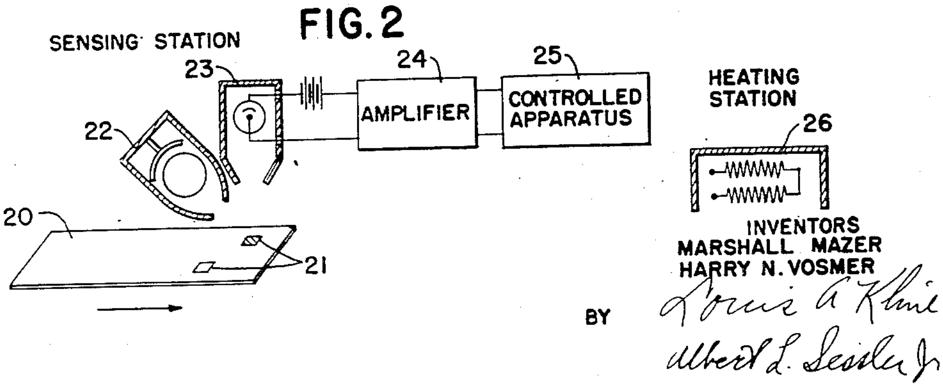
Fig. 2 is a diagrammatic showing of one form of apparatus which may be used to carry out the described method of apparatus control.

One novel method in which a record member may be utilized, together with the marking material of the present invention, is illustrated in the flow chart of Fig. 1 and the diagrammatic showing of Fig. 2. It is contemplated that this method may be used in the specific application of the invention set forth earlier in the specification. An apparatus which might be used in such a method, in cooperation with a record member 20, having control markings 21 thereon, is diagrammatically shown in Fig. 2 and comprises an activating ultra-violet radiation source 22, a photo-cell sensing mechanism 23, connected through an amplifier 24 to an apparatus 25, which is to be controlled by the record member 20, and a heating element 26 for causing the markings 21 to be sublimed off, thereby leaving the record member 20 in its original, unmarked, condition. The radiation source 22, the photo-cell 23, and the heating element 26 would be arranged in the relation shown, so that a record member 20, having marks 21 thereon and traveling in the direction shown by the arrow in Fig. 2, would be exposed first to the activating and sensing means at the same time, and subsequently to the heating element.

The first step of this method is to apply one or more data-representing control marks to a record member, using any suitable means, as before described. These marks are represented by small squares designated as "Inactive Control Marks of Sublimable Material" in Fig. 1.

Since marks made by the preferred liquid are invisible under ordinary light, they must be activated in order to be sensed, and this is accomplished in the next step by subjecting the record material to a source of radiation of the proper wave length, such as the ultra-violet radiation emitting source 22, thus causing the marks 21 to fluoresce. The activated marks are represented by small cross-hatched squares designated as "Activated Control Marks of Sublimable Material" in Fig. 1.

While the marks are fluorescing under the influence of the source 22 (Fig. 2), they may be sensed for apparatus control purposes by photo-cell 23. The resulting control signal is amplified by an amplifier 24 and then transmitted to a record-member-controlled apparatus 25, to cause the desired operation thereof to take place.

In the final step of the novel control method, the record member 20 is subjected to a source of heat, such as the heating element 26, where sufficient heat is applied to cause the control marks 21 to sublime to a gaseous state and pass off into the atmosphere, thus leaving the record member in its original, unmarked, condition.

It will, of course, be seen that the novel method of temporary recording, comprising the steps of applying the markings and subsequently removing them by the application of heat, might also be used in an application which employs visual inspection for reading of certain coded information, rather than machine sensing of the activated markings. In such a system, the data-representing marks would be activated by a suitable source of fluorescing radiation and directly viewed by an observer, after which they would be removed from the record member by the application of heat.

While the methods and the means shown and described herein are admirably suited to fulfill the objects previously stated, it is to be understood that it is not intended to confine the invention to the particular steps and means disclosed herein, for it is susceptible of being embodied in other steps and means, all coming within the spirit and scope of the invention.

What is claimed is:

A marking fluid for use in applying readily removable data-representing marks, which fluoresce when activated by ultra-violet radiation to produce a sensible signal, to a record member, consisting essentially of anthracene and naphthacene dissolved in ethyl hexane-diol and xylene, in the following proportions:

| | | |
|---|---|---|
| Anthracene | grams | 400 |
| Naphthacene | do | 4 |
| Ethyl hexane-diol | cc | 10,000 |
| Xylene | cc | 4,000 |

the ethyl hexane-diol and xylene being evaporable, and the anthracene and the naphthacene being sublimable when the marked record member is subjected to a temperature of approximately 300 degree Fahrenheit for a period not exceeding two seconds, for restoring the record member to its original, unmarked, condition.

References Cited in the file of this patent

UNITED STATES PATENTS

| | | |
|---|---|---|
| 2,631,243 | Weber | Mar. 10, 1953 |
| 2,673,153 | Talbot | Mar. 23, 1954 |
| 2,721,943 | Armistead | Oct. 25, 1955 |
| 2,733,216 | Eichholz | Jan. 31, 1956 |
| 2,745,967 | Ludeman | May 15, 1956 |
| 2,755,253 | Muehlhause | July 17, 1956 |
| 2,763,785 | Switzer | Sept. 18, 1956 |
| 2,773,892 | Little | Dec. 11, 1956 |

FOREIGN PATENTS

| | | |
|---|---|---|
| 417,488 | Great Britain | Oct. 5, 1934 |